(12) United States Patent
Park

(10) Patent No.: US 11,494,050 B2
(45) Date of Patent: Nov. 8, 2022

(54) ELECTRONIC DEVICE AND METHOD FOR CONTROLLING THE ELECTRONIC DEVICE

(71) Applicant: SAMSUNG ELECTRONICS CO., LTD., Suwon-si (KR)

(72) Inventor: Sungjae Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/205,347

(22) Filed: Mar. 18, 2021

(65) Prior Publication Data

US 2021/0303132 A1  Sep. 30, 2021

(30) Foreign Application Priority Data

Mar. 24, 2020 (KR) .................. 10-2020-0035733

(51) Int. Cl.
*G06F 3/048* (2013.01)
*G06F 3/04817* (2022.01)
(Continued)

(52) U.S. Cl.
CPC ........ *G06F 3/04817* (2013.01); *G06F 3/0482* (2013.01); *G06F 3/04886* (2013.01); *G06F 9/445* (2013.01)

(58) Field of Classification Search
None
See application file for complete search history.

(56) References Cited

U.S. PATENT DOCUMENTS 8,732,238 B2   5/2014   Steakley
9,478,195 B2  10/2016   Moy
(Continued)

FOREIGN PATENT DOCUMENTS

JP          4943488        5/2012
KR  10-2015-0136981       12/2015
(Continued)

OTHER PUBLICATIONS

International Search Report and Written Opinion dated Jul. 15, 2021 in corresponding International Application No. PCT/KR2021/003524.

*Primary Examiner* — Thanh T Vu
(74) *Attorney, Agent, or Firm* — Nixon & Vanderhye, P.C.

(57) ABSTRACT

Disclosed is an electronic device and a method for controlling the electronic device. The method for controlling an electronic device includes: searching for an external device connectable to an electronic device; requesting information, from an external device identified by the searching, about an application installed in the external device; receiving, from the external device, information corresponding to the installed application; identifying at least one application, among a plurality of applications included in the information corresponding to the installed application, which is executable by the electronic device; displaying, on a display, at least one icon corresponding to the at least one identified application based on the information corresponding to the installed application; and based on one of the at least one icon being selected, requesting information required for execution of an application corresponding to the selected icon by communicating with the external device and executing the application installed in the external device.

18 Claims, 15 Drawing Sheets

(51) Int. Cl.
*G06F 9/445* (2018.01)
*G06F 3/04886* (2022.01)
*G06F 3/0482* (2013.01)

(56) References Cited

U.S. PATENT DOCUMENTS

| | | |
|---|---|---|
| 9,887,871 B2 | 2/2018 | Lee et al. |
| 10,200,859 B2 | 2/2019 | Chen et al. |
| 10,248,399 B2 | 4/2019 | Yoon |
| 10,735,930 B2 | 8/2020 | Yuan et al. |
| 2013/0282658 A1* | 10/2013 | Besen .................. G06F 16/178 707/634 |
| 2013/0304795 A1* | 11/2013 | Kang ............... H04N 21/43637 709/202 |
| 2015/0120817 A1 | 4/2015 | Jeong et al. |
| 2015/0347114 A1 | 12/2015 | Yoon |
| 2016/0006803 A1* | 1/2016 | Kumar ................ H04L 67/1091 719/329 |
| 2016/0037205 A1 | 2/2016 | Lee |
| 2016/0321055 A1* | 11/2016 | Mihalcea .................. G06F 8/24 |
| 2016/0360339 A1 | 12/2016 | Yuan et al. |
| 2017/0111697 A1 | 4/2017 | Choi et al. |
| 2019/0220264 A1 | 7/2019 | Yoon |

FOREIGN PATENT DOCUMENTS

| | | |
|---|---|---|
| KR | 10-2016-0144296 | 12/2016 |
| KR | 10-1973531 | 9/2019 |

\* cited by examiner

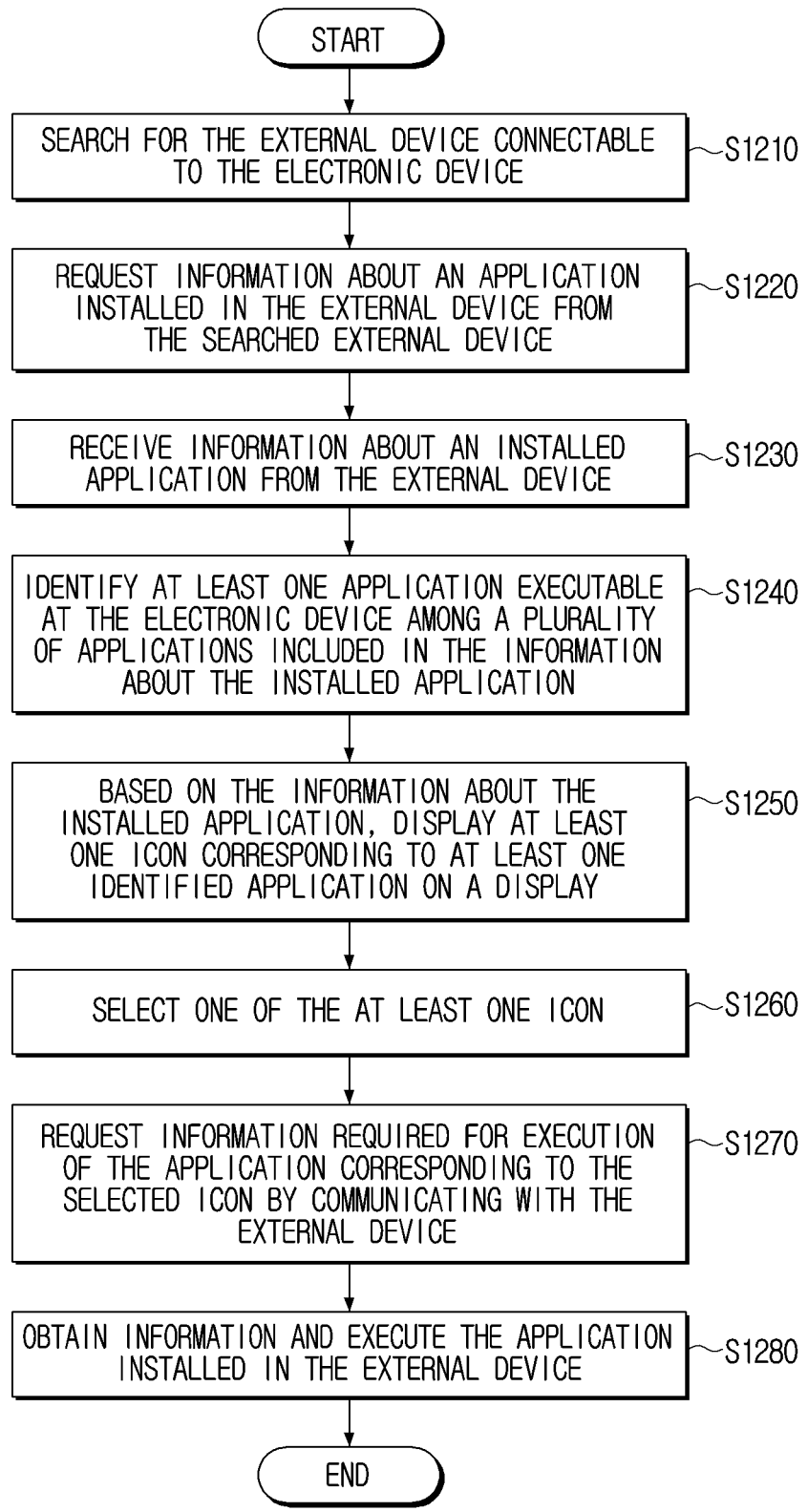

ELECTRONIC DEVICE AND METHOD FOR CONTROLLING THE ELECTRONIC DEVICE

CROSS-REFERENCE TO RELATED APPLICATION

This application is based on and claims priority under 35 U.S.C. § 119 to Korean Patent Application No. 10-2020-0035733, filed on Mar. 24, 2020, in the Korean Intellectual Property Office, the disclosure of which is incorporated by reference herein in its entirety.

BACKGROUND

1. Field

The disclosure relates to an electronic device and a method for controlling thereof. For example, the disclosure relates to an electronic device for executing an application installed in an external device at an electronic device and a method for controlling thereof.

2. Description of Related Art

In a related art, in order to execute an application installed in an external device at an electronic device different from the external device, a process of installing the application in the electronic device is required.

According to a related-art remote storage service using a web application (Web App) or a wireless external hard disk, whether an application installed in the external device may be automatically executable at the electronic device may not be identified or an execution file of an application installed in an external device may not be identified automatically.

There is a need of an art to execute an application installed in an external device at an electronic device without separate installation, or an art to identify whether the application installed in an external device is automatically executable at an electronic device.

SUMMARY

Example embodiments of the disclosure address at least the above-mentioned problems and/or disadvantages and provide at least the advantages described below. Embodiments of the disclosure provide an electronic device for executing an application installed in an external device without installing the application at the electronic device and a method for controlling thereof.

According to an example embodiment, a method for controlling an electronic device includes: searching for an external device connectable to an electronic device; requesting information from the external device about an application installed in the external device; receiving, from the external device, information corresponding to the installed application; identifying at least one application among a plurality of applications included in the information corresponding to the installed application, which is executable at the electronic device; displaying, on a display, at least one icon corresponding to the at least one identified application based on the information corresponding to the installed application; and based on one of the at least one icon being selected, requesting information required for execution of an application corresponding to the selected icon by communicating with the external device and executing the application installed in the external device.

According to an example embodiment, an electronic device includes: a display, a communication interface comprising communication circuitry, a memory including at least one instruction, and a processor, connected to the display, the communication interface, and the memory, configured to control the electronic device by executing the at least one instruction, to: search for an external device connectable to an electronic device; request information corresponding to an application installed in the external device from the searched external device, through the communication interface; receive, from the external device, information corresponding to the installed application, through the communication interface; identify at least one application, among a plurality of applications included in the information corresponding to the installed application, which is executable at the electronic device; display, on the display, at least one icon corresponding to the at least one identified application based on the information corresponding to the installed application; and based on one of the at least one icon being selected, request information required for execution of an application corresponding to the selected icon by communicating with the external device and executing the application installed in the external device.

According to an example embodiment, a method for controlling an electronic device includes: searching for a first external device connectable to an electronic device; receiving, from the first external device, information corresponding to an application installed in a second external device executable at the first external device; displaying, on a display, at least one icon corresponding to an application installed in the second external device executable at the first external device based on the information corresponding to the application; and based on one of the at least one icon being selected, transmitting, to the first external device, a request for executing an application to execute an application corresponding to the selected icon at the first external device.

According to various example embodiments, an electronic device may automatically identify whether an application installed in an external device is executable at the electronic device without a separate operation of a user.

According to various example embodiments, the electronic device may easily control an application installed in an external device not including a display.

BRIEF DESCRIPTION OF THE DRAWINGS

The above and/or other aspects, features, and advantages of certain embodiments of the present disclosure will be more apparent from the following detailed description, taken in conjunction with the accompanying drawings, in which:

FIG. 12 is a flowchart illustrating an example method for controlling an electronic device according to various embodiments.

DETAILED DESCRIPTION

Figure 1:
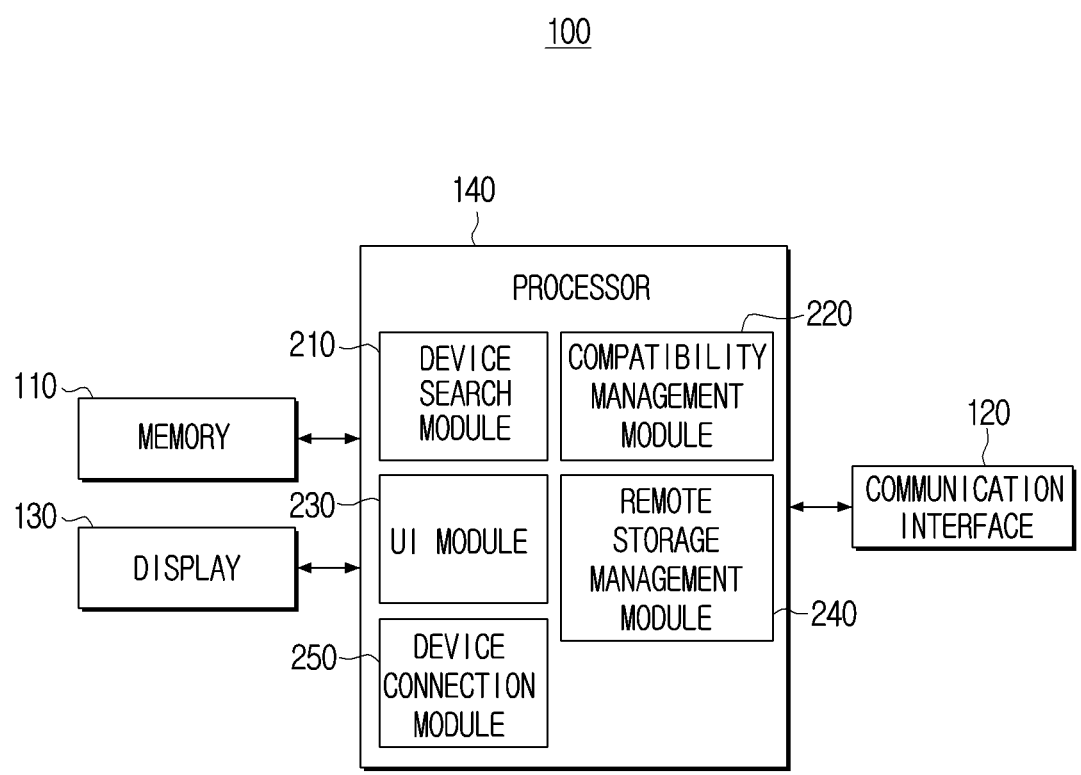
FIG. 1 is a block diagram illustrating an example configuration of an electronic device according to various embodiments.

FIG. 1 is a block diagram illustrating an example configuration of an electronic device according to various embodiments.

Referring to FIG. 1, an electronic device 100 may include a memory 110, a communication interface (e.g., including communication circuitry) 120, a display 130, and a processor (e.g., including processing circuitry) 140. The electronic device 100 may be implemented as an electronic device of various types such as, for example, and without limitation, a smartphone, an augmented reality (AR) glass, tablet personal computer (PC), a mobile phone, a video phone, an e-book reader, a TV, a desktop PC, a laptop PC, a netbook computer, a workstation, a camera, a smartwatch, or the like. The embodiment is not limited thereto and the electronic device 100 according to an embodiment may be implemented with various electronic devices including a display usable at home.

The memory 110 may store various programs and data necessary for operating the electronic device 100. The memory 110 may store at least one instruction. The processor 140 may perform an operation of the electronic device 100 by executing an instruction stored in the memory 110.

The memory 110 may be implemented, for example, and without limitation, as a non-volatile memory, a volatile memory, a flash memory, a hard disk drive (HDD), a solid state drive (SSD), or the like. The memory 110 is accessed by the processor 140 and reading/writing/modifying/deleting/updating of data by the processor 140 may be performed. In the disclosure, the term memory may include the memory 110, read-only memory (ROM) in the processor 140, random access memory (RAM), or a memory card (for example, a micro SD card, and a memory stick) mounted to the electronic device 100. The memory 110 may store programs, data, or the like, to configure various screens to be displayed on a display region of a display.

The communication interface 120 may include various communication circuitry and communicate with an external device. Communication of the communication interface 120 with an external device may include communication through a third device (e.g., a relay, a hub, an access point, a server, a gateway, etc.). According to an embodiment, the communication interface 120 may search an external device connectable with the electronic device 100. The external device according to an embodiment may be a device that may execute an application by installing an application. For example, and without limitation, the external device may be implemented with an electronic device such as a tablet PC, a wearable device, a TV, a smartphone, or the like. The embodiment is not limited thereto and may be implemented with an electronic device not including a display, such as a speaker, a refrigerator, an air purifier, or the like.

The communication interface 120 may communicate with an external electronic device through wireless communication or wired communication. Wireless communication may include cellular communication using at last one of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to an embodiment, the wireless communication may include, for example, any one or any combination of wireless fidelity (Wi-Fi), Bluetooth, Bluetooth low energy (BLE), Zigbee, near field communication (NFC), magnetic secure transmission, radio frequency (RF), or body area network (BAN). Wired communication may include, for example, a universal serial bus (USB), a high definition multimedia interface (HDMI), a recommended standard 232 (RS-232), a power line communication, or a plain old telephone service (POTS). The network over which the wireless or wired communication is performed may include any one or any combination of a telecommunications network, for example, a computer network (for example, local area network (LAN) or wide area network (WAN)), the Internet, or a telephone network.

The communication interface 120 may request information about (corresponding to) an application installed in the external device to the searched external device. The communication interface 120 may receive, from the external device, information about (corresponding to) an application installed in the external device. The information on the application may include application manifest information and an application list installed in the external device.

The electronic device 100 may perform communication with an external device through the communication interface 120 to request information required for execution of an application installed in the external device to execute an application installed in the external device. The details will be described later.

The display 130 may display various information according to the control of the processor 140. The display 130 may be implemented as various types of displays such as, for example, and without limitation, a liquid crystal display (LCD) panel, light emitting diode (LED), organic light emitting diode (OLED), liquid crystal on silicon (LCoS), digital light processing (DLP), and the like. In the display (not shown), a backlight unit, a driving circuit which may be implemented as a format such as an a-Si TFT, low temperature poly silicon (LTPS) TFT, organic TFT (OTFT), and the like, may be included as well.

The display 130 may be coupled with a touch panel and implemented with a touch screen. However, this is merely an example and the display 130 may be implemented in a diverse manner.

The display 130 may display at least one icon corresponding to at least one application installed in an external device executable at the electronic device 100 based on information on an application installed in the external device received from the external device. At least one icon corresponding to at least one application may be displayed in various ways, and will be described in detail later with reference to the accompanying drawings.

The processor 140 may include various processing circuitry and be electrically connected to the memory 110 to control the overall operation and function of the electronic device 100. The processor 140 may provide an application sharing function for executing an application installed in an external device in the electronic device 100. According to an embodiment, an application sharing function may be implemented through a plurality of modules included in the processor 140, as shown in FIG. 1, but an application sharing function may be implemented in an external server.

The application sharing function may be implemented, for example, through a device search module (e.g., including processing circuitry and/or executable program elements) 210, a compatibility management module (e.g., including processing circuitry and/or executable program elements) 220, a user interface (UI) module (e.g., including processing circuitry and/or executable program elements) 230, a remote storage management module (e.g., including processing circuitry and/or executable program elements) 240, and a device connection module (e.g., including processing circuitry and/or executable program elements) 250, as illustrated by way of non-limiting example in FIG. 1. A plurality of modules may be implemented in respective software, but some modules may be implemented in a combination of hardware and software. According to an embodiment, the plurality of modules may be implemented with one software. In addition, some modules may be implemented within the electronic device 100, and some other modules may be implemented in an external server.

The device search module 210 may search for an external device connectable with the electronic device 100. The device search module 210 may search for an external device within a network environment same as the electronic device 100. According to an embodiment, the external device within the same network environment may be an external device present in a network connection environment (local area network (LAN), wide area network (WAN), bluetooth (BT), etc.) same as the electronic device 100. According to an embodiment, the external device within the same network environment may be an external device within a Wi-Fi environment, same as the electronic device 100.

The device search module 210 may transmit a user datagram protocol (UDP) packet to a specific port for each external device Internet protocol (IP) address in a network to search an external device connectable to the electronic device 100. In an embodiment, the external device connectable with the electronic device 100 may be a device that belongs to the same network environment as the electronic device 100.

The device search module 210 may include various processing circuitry and/or executable program elements and identify the external device responsive with a user datagram packet (UDP) within a preset time (e.g., 30 seconds) as the external device connectable with the electronic device 100.

The device search module 210 may request, to the identified external device, information corresponding to an application installed in the external device. The device search module 210 may receive information, from the external device, corresponding to the application installed in the external device.

According to an embodiment, information corresponding to an application installed in the external device may include application manifest information and an application list installed in the external device. The application manifest information may include information necessary for execution of the application. The application manifest information may include an execution code and data necessary for execution of the application. In an embodiment, the application manifest information may include, without limitation, at least one of information about a version of an application, information about an authority required for executing an application, information on an application package identification (ID), information on platform application programming interface (API) version, information on an application execution file, information on an icon file, and developer information, or the like. The application manifest information may further include other information necessary for executing the application.

When the electronic device 100 receives information corresponding to an application installed in the external device from the external device, the compatibility management module 220 may analyze the application manifest information for the application installed in the external device to identify at least one application executable at the electronic device 100 among the applications installed in the external device.

The compatibility management module 220 include various processing circuitry and/or executable program elements and is configured to identify whether the application installed in the external device is executable at the electronic device 100.

The compatibility management module 220 may identify at least one application executable at the electronic device 100 among the applications included in the application list installed in the external device by using information on a platform minimum version in which each of a plurality of applications included in the application manifest information are executable, information about ISA (ARM, x86, etc.), or VM version and type, information on the type and model of the external device, information on the type and model of the external device, information on supportable country for each of the plurality of applications installed in the external device.

According to an embodiment, the compatibility management module 220 may update information about a configuration required when an application installed in the external device is executed in the electronic device 100. For example, the compatibility management module 220 may identify a file required to execute an application installed in an external device to be executed in the electronic device 100 using information on an application installed in the external device. If the file required to execute the application is identified, the compatibility management module 220 may identify compatibility of the file list to which access is required in the external device. Based on the identified compatibility, the compatibility management module 220 may obtain a file and a folder list to be managed by the remote storage management module 240.

When the application installed in the external device is executed in the electronic device 100, the compatibility management module 220 may reconfigure the installation information of the application which has no compatibility issue according to the format of the package manager of the electronic device 100. According to an embodiment, when an application installed in the external device is to be executed in the electronic device 100, additional resource files, such as an icon file for the corresponding application, or the like, may be required. In this example, while the compatibility management module 220 adds installation information for the corresponding application to the package manager of the electronic device 100, additional resource files, or the like, may be brought from the external device, or the remote storage management module 240 may be controlled so that the electronic device 100 may access the resource file stored in the external device.

When an application executable at the electronic device 100 is identified through the compatibility management module 220, the UI module 230 may display an icon corresponding to the identified application on the display 130. The UI module 230 may include various processing circuitry and/or executable program elements and display an icon corresponding to an application executable at the electronic device 100 among applications installed in the external device on the display 130.

According to an embodiment, the UI module 230 may display an icon corresponding to the application executable at the electronic device 100, among the applications installed in the external device, on a home screen, an APPs list, a widget list, or the like.

According to an embodiment, an icon corresponding to the application executable at the electronic device 100, among the applications installed in the external device, may further include an identifier of an application installed in an external device so as to be distinguished from the application installed in the electronic device 100.

According to an embodiment, the UI module 230 may display a list of applications executable at the electronic device 100 among applications installed in the external device on the display 130, and may display icons corresponding to the application selected by the user in the list for the displayed application on the display 130.

When an icon corresponding to an application executable at the electronic device 100 among the applications installed in the external device is selected, the UI module 230 may further display a UI for identifying whether to execute the application corresponding to the selected icon in the electronic device 100 or in the external device.

A method of displaying an icon corresponding to an application installed in an external device by the UI module 230 and a method of executing the application by the UI module 230 will be described in greater detail below with reference to the drawings.

When an execution command for an application installed in the external device is detected in the electronic device 100, the remote storage management module 240 may identify the validity of the package ID through information on the package ID included in the application manifest information for the application. The remote storage management module 240 may include various processing circuitry and/or executable program elements and search a storage location of the execution file using the package manager information. The remote storage management module 240 may request a connection to the external device via the device connection module 250 and receive the executable file from the remote storage management module of the external device. The device connection module 250 may include various processing circuitry and/or executable program elements and is configured to connect a device in which an application is installed and a device to execute an application. According to an embodiment, the device connection module 250 may control the processor 140 such that a portion of the storage space in the external device is accessible from the electronic device 100, and an application installed in the external device is executed in the electronic device 100.

For example, the remote storage management module 240 may manage folder mapping information related to an application installed in an external device. For example, when the locations in which the file for the first application installed in the external device executable at the electronic device 100 are different for the electronic device 100 and the external device 100 from each other, the remote storage management module 240 may generate folder mapping information on the path of the files corresponding to the selected icon. For example, if the file for the first application file is stored in "/opt/usr/apps/com.samsung.hello-world/bin/hello" folder in the external device, and stored in "/opt/usr/shared_apps/com.samsung.hello-world/bin/hello" folder in the electronic device 100, the remote storage management module 240 may generate folder mapping information such as "apps/com.samsung.hello-world a shared_apps/com.samsung.hello-world". If the icon for the first application displayed on the display 130 of the electronic device 100 is selected, a connection between the electronic device 100 and the external device may be performed, and the remote storage management module 240 may execute the first application in the electronic device 100 using the folder mapping information for the first application.

According to an embodiment, when an execution command for a second application installed in an external device is detected in the electronic device 100, the remote storage management module 240 may perform a connection between the electronic device 100 and the external device through the device connection module 250. When the electronic device 100 and the external device are connected, the remote storage management module 240 may request the external device to read an execution file for the second application and receive information related to the reading of the second application execution file from the external device. When information related to the reading of the execution file is received, the processor 140 may execute the application process code included in the received information, so that the second application may be executed in the electronic device 100.

The remote storage management module 240 may manage file mapping information related to an application installed in the external device. For example, if a file necessary for execution of the second application is not present in the folder for the second application of the electronic device 100 during execution of the second application installed in the external device in the electronic device 100, the remote storage management module 240 may generate the file mapping information for the file necessary for execution of the second application. According to an embodiment, the file required for executing the second application may include a library file or a data file that may be accessed during a second application execution. If the library file or the data file is needed during the execution of the second application, the remote storage management module 240 may request the external device a reading and a writing function for a file required for executing the second application based on the file mapping information for the second application. The remote storage management module 240 may receive information related to a read and write function of the file required for executing the second application from the external device. Based on the received information, the second application may be executed in the electronic device 100.

According to an embodiment, when the second application is executed in the electronic device 100, the remote storage management module 240 may control the electronic device 100 to access the file stored in the external device associated with the second application. For example, when the second application is a gallery application for displaying a photo and a video on a display, the remote storage management module 240 may enable the electronic device 100 to access a folder storing a photo and a video stored in an external device in which the second application is installed, and may control to display a list of a photo and a video on the display 130 of the electronic device 100.

The processor 140 may be include various processing circuitry including of one or a plurality of processors. The processor 140 may be implemented, for example, and without limitation, as a general-use processor such as a central processing unit (CPU), a dedicated processor, an application processor (AP), a graphics-only processor such as a graphics processing unit (GPU), a vision processing unit (VPU), an artificial intelligence (AI)-only processor such as a neural processing unit (NPU), or the like.

The one or more processors control the processing of the input data according to a predefined operating rule or AI model stored in the memory. The predefined operating rule or AI model may be made through learning. The AI model being made through learning may refer for example, to the learning algorithm being applied to a plurality of learning data, so that a predefined operating rule or AI model of a desired characteristic is generated. The learning of the AI model may be performed in a device itself in which AI according to the disclosure is performed, and may be implemented through a separate server/system.

The electronic device 100 is not illustrated in FIG. 1, but may further include an input interface. The input interface may include various circuitry and receive a user command. According to an embodiment, the input interface may include at least one of a physical button or a voice recognition sensor for receiving a user command, and may be implemented in the form of a touch screen for sensing a user touch operation. The input interface may include a physical button, and the user may input a user command by pressing a physical button. The input interface may include a touch screen and the user may input a user command by touching a touch screen. The input interface may include a voice recognition sensor, and the user may input a user command by uttering a user voice to a microphone. For example, the input interface may include a physical button and a voice recognition sensor, but the input interface may include various configurations capable of receiving a command of a user by interacting with a user.

A method of executing an application installed in an external device by the electronic device 100 has been described. However, the application sharing function according to the disclosure is not limited thereto, and the application installed in the electronic device 100 may be executed in an external device. The electronic device 100 may control a first external device and a second external device such that the application installed in the first external device is executed in the second external device, and the detailed description thereof will be described with reference to the accompanying drawings.

According to a related-art remote storage service using a Web App or a wireless external hard, it was not possible to identify whether an application installed in an external device may be executed automatically in the electronic device 100 or the execution file of the application installed in the external device may not be identified automatically, unlike the application sharing function of the disclosure.

In order to execute an application not installed in the electronic device 100 according to a comparative example such as a web application, a process of installing a corresponding application or executing an application of an intermediate step such as a browser or a web runtime, and then receiving and executing a uniform resource locator (URL) associated with a web application must be performed in advance. Unlike the application sharing function according to the disclosure, in the comparative example of the web app, an application installed in the external device may not be directly executed at the electronic device 100 without installation.

According to the comparative example such as the wireless external hard (e.g., network file system (NFS) or common Internet file system (CIFS)), the user should carry out a process of installing the application in the electronic device 100 to execute a predetermined application in the electronic device 100 and the application files may be copied through a designated path through installation.

According to the application sharing function, unlike the above-described comparison example, the compatibility management module 220 may identify whether the application installed in the external device is executable at the electronic device 100, and manage the file information and the folder information for the application installed in the external device, so that the sharing possibility of the application may be automatically analyzed and the execution file of the shared application may be automatically identified without a separate task of the user.

Through the application sharing function, the electronic device 100 may easily control the application installed in the external device not including a display. The electronic device 100 may control so that the application installed in the electronic device 100 is executable at an external device not including a display.

Figure 2A:
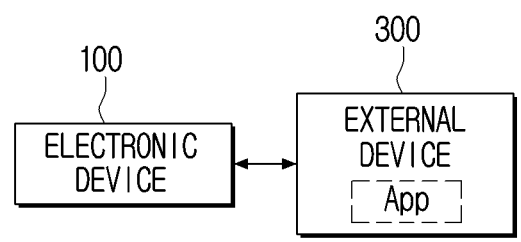
FIG. 2A is a block diagram illustrating an example method for executing an application installed in an external device by an electronic device according to various embodiments.
Figure 2B:
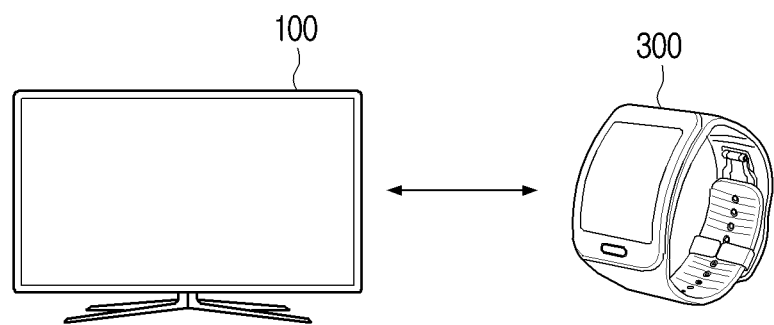
FIG. 2B is a diagram illustrating an example of executing an application installed in an external device by an electronic device according to various embodiments.

FIG. 2A is a block diagram illustrating an example method for executing an application installed in an external device by an electronic device according to various embodiments, and FIG. 2B is a diagram illustrating an example of executing an application installed in an external device by an electronic device according to various embodiments.

Referring to FIG. 2A, according to an embodiment, the electronic device 100 may execute the application installed in an external device 300 at the electronic device 100.

The electronic device 100 may search for the external device 300 connectable with the electronic device 100 and may perform connection with the found external device 300. According to an embodiment, the external device 300 which may transmit a user demand protocol (UDP) packet to a specific port by IPs of each external device in the network and receive information responsive to the UDP packet by the electronic device 100 may be identified as the external device 300 connectable to the electronic device 100.

The electronic device 100 may obtain information on an application installed in the external device 300 from the connected external device 300, and may identify at least one application executable at the electronic device 100 through the obtained information. According to an embodiment, the information on the installed application may include application manifest information and information about a list of applications installed in the external device.

Icons corresponding to each of the at least one identified application may be displayed on the display 130. If one of the at least one icons is selected, by requesting information required for execution of the application corresponding to the selected icon by performing communication with the external device 300, an application installed in the external device 300 may be executed.

Referring to FIG. 2B, the electronic device 100 according to various embodiments may be implemented, for example, and without limitation, as a TV, and the external device 300 may be implemented, for example, and without limitation, as a smart watch. According to an embodiment, the electronic device 100 may execute a health care application installed in the external device 300, which may, for example, include a smart watch, in the electronic device 100, which may, for example, include a TV. The electronic device 100 may access user information for the health care application stored in the external device 300 and display or manage health care information for a user using the external device 300 in the electronic device 100.

According to an embodiment, the electronic device 100 may perform management of the application installed in the external device 300. The electronic device 100 may perform update of an application install the external device 300. The electronic device 100 may change setting relative to the application installed in the external device 300.

A method of executing the application installed in the external device 300 in the electronic device 100 will be described in greater detail below with reference to FIGS. 3, 4, and 5.

Figure 3:
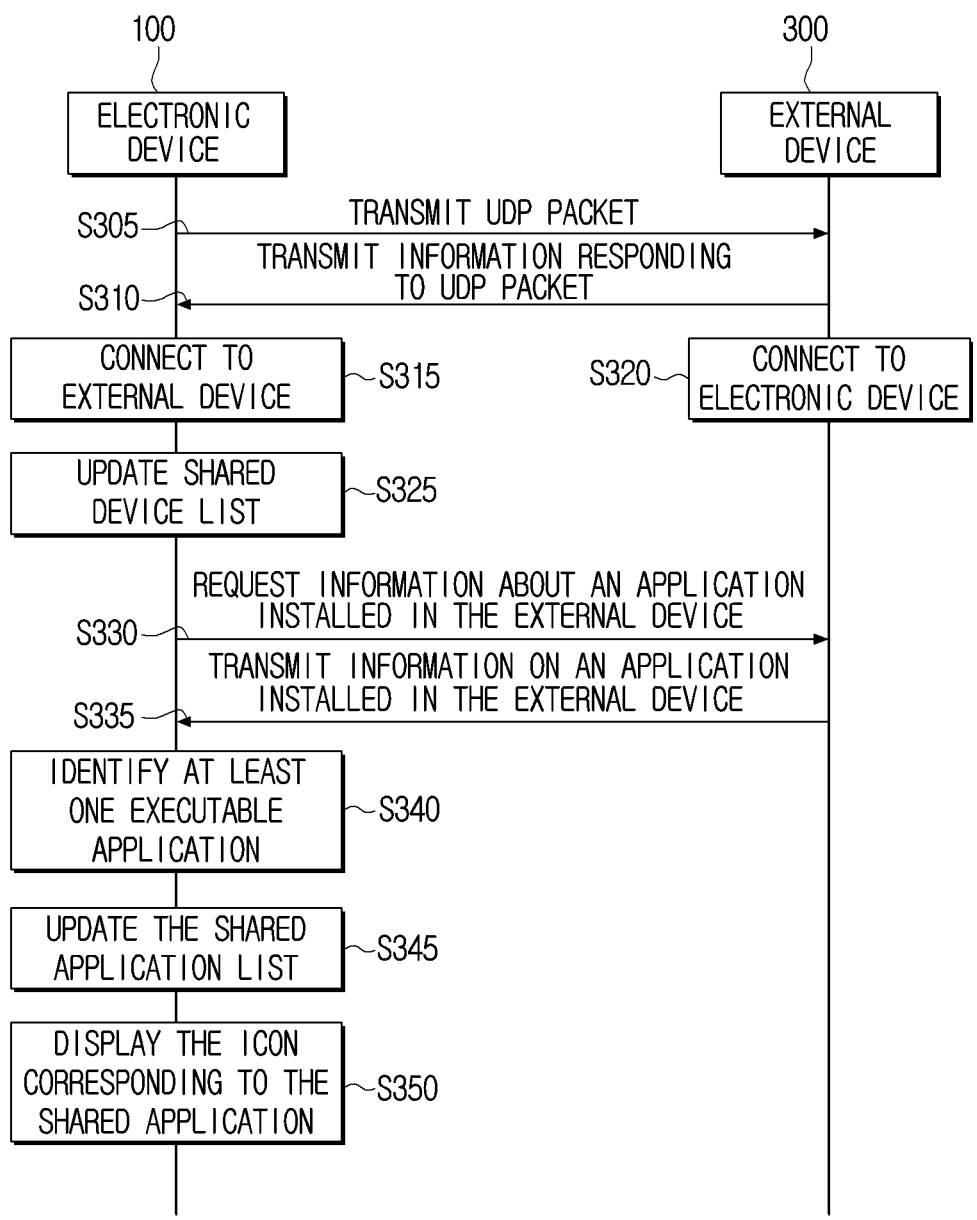
FIG. 3 is a signal flow diagram illustrating an example method for setting execution of an application installed in an external device by an electronic device according to various embodiments.

FIG. 3 is a signal flow diagram illustrating an example method for setting execution of an application installed in an external device by an electronic device according to various embodiments.

The electronic device 100 may transmit a UDP packet to the external device 300 in operation S305. For example, the electronic device 100 may transmit a UDP packet to a specific port for each IP for each external device in a network communicatively connected to the electronic device 100 to search the external device 300 connectable to the electronic device 100. The external device 300 may transmit information responding to the UDP packet to the electronic device 100 in operation S310.

When the electronic device 100 receives information in response to the UDP packet from the external device 300, the electronic device 100 may identify the external device 300 as a connectable device and may perform a connection with the external device 300 in operation S315. The external device 300 may perform connection to the electronic device 100 in operation S320.

The electronic device 100 may update a shared device list in operation S325. By identifying the external device 300 to which connection is performed as a shared device, the external device 300 may be added to the shared device list.

The electronic device 100 may request information about an application installed in the external device 300 from the external device 300 in operation S330. The external device 300 may transmit information on an application installed in the external device 300 to the electronic device 100 in operation S335. According to an embodiment, information on an application installed in an external device may include, for example, and without limitation, application manifest information and an application list installed in an external device.

When the electronic device 100 obtains information on an application installed in the external device 300, the electronic device 100 may identify at least one application executable at the electronic device 100 among the plurality of applications included in the information about the application installed in the external device 300 in operation S340. According to an embodiment, the electronic device 100 may analyze application manifest information about an application installed in the external device 300 to identify at least one application executable at the electronic device 100 among applications installed in the external device 300. The electronic device 100 may identify at least one application executable at the electronic device 100, among the applications included in the list of application installed in the external device 300, using is information about the platform minimum version in which each of the plurality of applications included in the application manifest information for the application installed in the external device 300 may be executed, ISA (ARM, x86, etc.) or information about the VM version and type, information about the type and model of the external device 300, supporting country information for each of the plurality of applications installed in the external device 300, etc.

If at least one application executable at the electronic device 100 is identified, the electronic device 100 may update the shared application list in operation S345. According to an embodiment, the identified application may be added to a shared application list. The icon corresponding to the shared application may be displayed in operation S350. According to an embodiment, the electronic device 100 may display an icon corresponding to an application executable at the electronic device 100 among applications installed in the external device 300 in a home screen, an application list, a widget list, or the like.

According to an embodiment, the electronic device 100 may further include an identifier in an icon corresponding to the application executable at the electronic device 100 that the application is installed in the external device, among the applications installed in the external device, so that the application is distinguished from an application installed in the electronic device 100.

A method of displaying an icon for the application installed in the external device will be described in greater detail below with reference to FIGS. 6 and 7.

Figure 4:
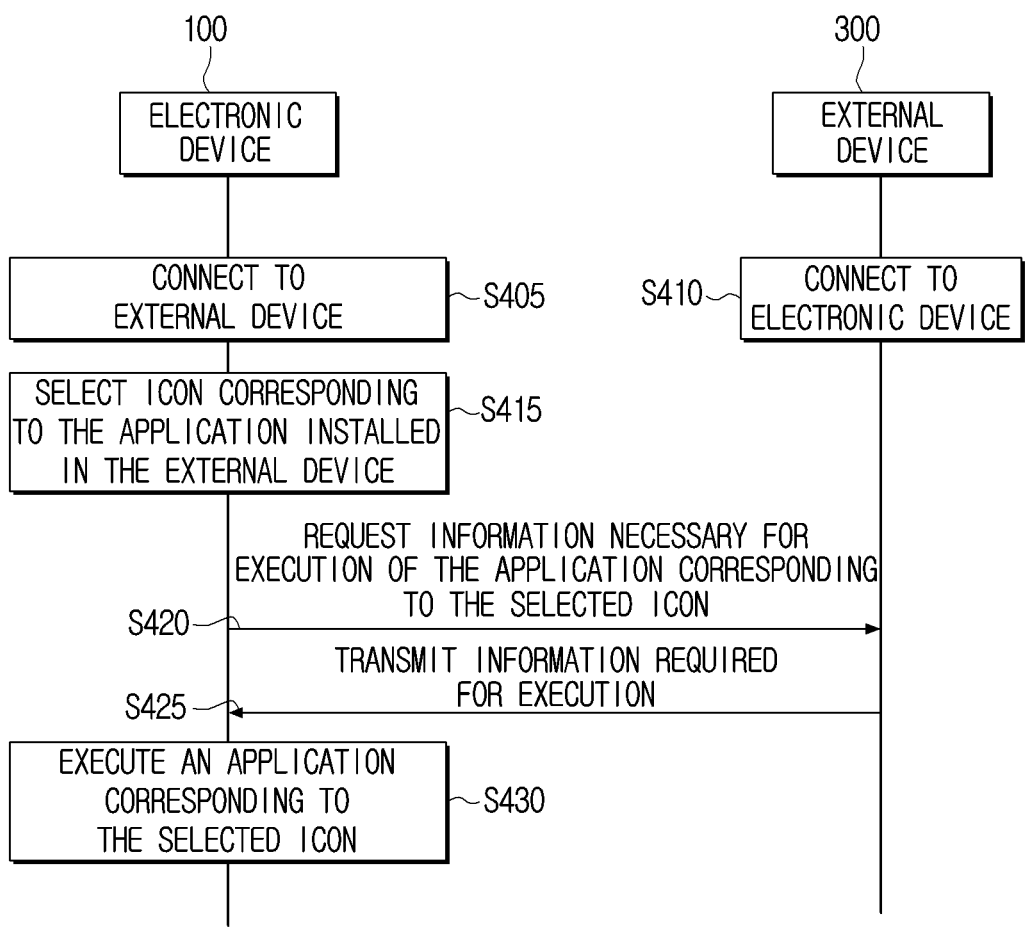
FIG. 4 is a signal flow diagram illustrating an example method for executing an application installed in an external device by an electronic device according to various embodiments.

FIG. 4 is a signal flow diagram illustrating an example method for executing an application installed in an external device by an electronic device according to various embodiments.

When the electronic device 100 is connected to the external device 300 in operation S405, and the external device 300 is connected to the electronic device 100 in operation S410, an icon corresponding to the application installed in the external device 300 may be selected in the electronic device 100 in operation S415.

According to an operation of S350 of FIG. 3, at least one icon corresponding to the sharing application may be displayed on the electronic device 100 and one icon, among at least one icons, may be selected by the user.

When the icon is selected, the electronic device 100 may request information necessary for execution of the application corresponding to the selected icon to the external device 300 in operation S420. When the icon is selected, the electronic device 100 may identify that the execution command for the application corresponding to the selected icon is sensed, and the electronic device 100 may identify the validity of the package ID through the information on the package ID included in the application manifest information for the corresponding application. The electronic device 100 may search the storage location of the execution file using the package manager information. The external device 300 may transmit an execution file to the electronic device 100 in operation S425.

When the electronic device 100 receives information necessary for an execution file corresponding to the selected icon from the external device 300, the electronic device 100 may execute an application corresponding to the selected icon in operation S430. According to an embodiment, the electronic device 100 may execute an application corresponding to the selected icon through folder mapping information and file mapping information associated with an application installed in the external device.

Figure 5:
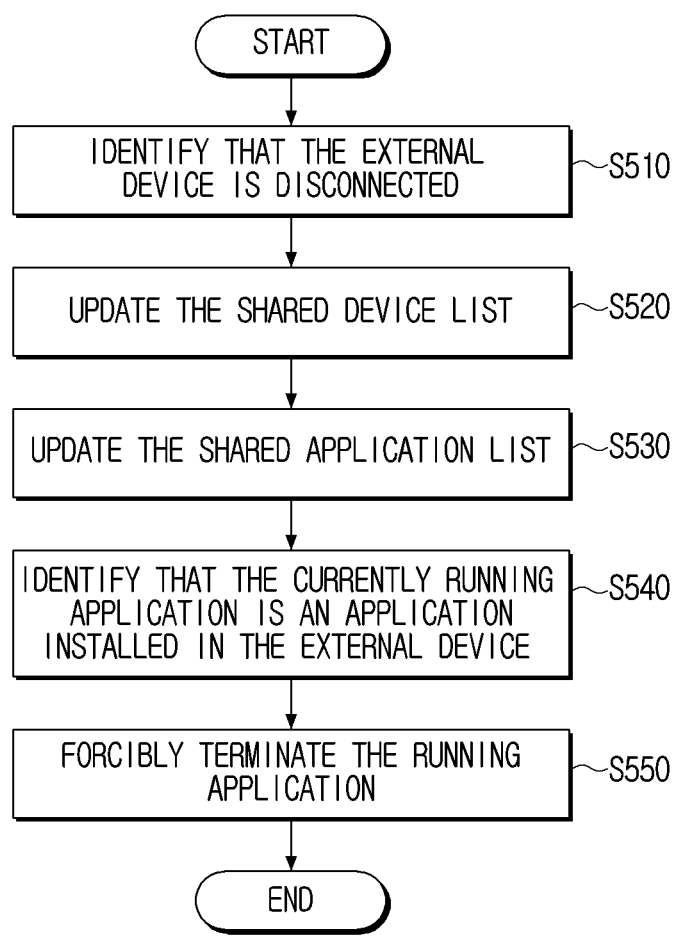
FIG. 5 is a flowchart illustrating an example method for controlling an electronic device as connection between an external device and an electronic device is disconnected, according to various embodiments.

FIG. 5 is a flowchart illustrating an example method for controlling an electronic device as connection between an external device and an electronic device is disconnected, according to various embodiments.

The electronic device 100 may identify that the external device 300 is disconnected from the external device 300 in operation S510. According to an embodiment, if the external device 300 is not within a network environment same as the electronic device 100, the electronic device 100 may identify that the external device 300 is disconnected from the external device 300. According to an embodiment, after the connection between the electronic device 100 and the external device 300 is performed, if the electronic device 100 transmits the UDP packet to the port for the IP of the external device 300, but when the electronic device 100 does not receive information responding to the UDP packet from the external device 300 within a predetermined time (e.g., 30 seconds), the electronic device 100 may identify that the external device 300 is disconnected from the external device 300.

If it is identified that the external device 300 is disconnected, the electronic device 100 may update the shared device list in operation S520. By deleting the external device 300 included in the former list of shared device from the shared device list, the shared device list may be updated.

The electronic device 100 may update the sharing application list in operation S530. By deleting the application installed in the external device 300 from the former sharing application list, the sharing application list may be updated.

If it is identified that the currently running application is an application installed in the external device in operation S540, the electronic device 100 may forcibly terminate the running application in operation S550. According to an embodiment, the electronic device 100 may display a UI informing that the external device 300 has been disconnected while forcibly terminating the running application.

Figure 6:
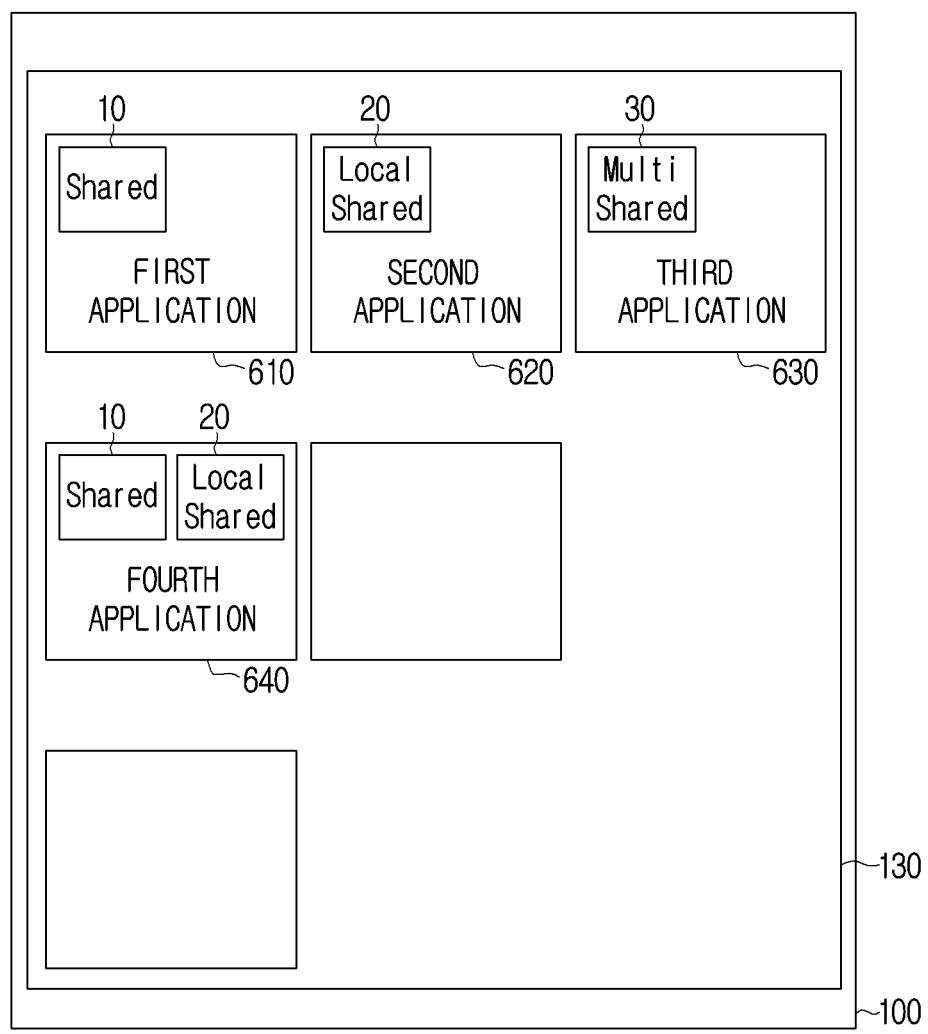
FIG. 6 is a diagram illustrating an example user interface (UI) to distinguish and display a sharing application with another application according to various embodiments.

FIG. 6 is a diagram illustrating an example user interface (UI) to distinguish and display a sharing application with another application according to various embodiments.

According to an embodiment, an icon corresponding to an application executable at the electronic device 100 among applications installed in the external device 300 may be displayed to be distinguished from an application installed in the electronic device 100.

Referring to FIG. 6, the electronic device 100 may display an icon corresponding to at least one application displayed on the display 130.

According to an embodiment, an icon 610 corresponding to the first application executable at the electronic device 100 among the applications installed in the external device 300 may further include a first identifier 10 of "Shared". As the icon 610 corresponding to the first application installed in the external device 300 includes the first identifier 10, the user may easily recognize that the corresponding application is an application installed in the external device 300.

According to an embodiment, when the second application installed in the electronic device 100 is shared to be executable at the external device 300, the electronic device 100 may further include a second identifier 20 of "local shared" in an icon 620 corresponding to the second application on the display 130. Since the icon 620 corresponding to the second application shared to be executed in the external device 300 includes a second identifier 20, the user may easily recognize that the corresponding application is an application executable at the external device 300.

According to an embodiment, the electronic device 100 may control a third application installed in a plurality of external devices to be executed in one external device among a plurality of external devices in which a third application is installed. An icon 630 corresponding to a third application installed in the plurality of external devices may further include a third identifier 30 of "Multi Shared". Since the icon 630 corresponding to the third application installed in the plurality of external devices includes a third identifier 30, the user may easily recognize that the electronic device 100 may control the third application to be executed on one external device among the plurality of external devices. When the icon 630 corresponding to the third application is selected, the electronic device 100 may further display, on the display 130, a UI for selecting an external device to execute an application among the plurality of external devices. A UI capable of selecting an external device to execute an application among a plurality of external devices will be described later with reference to FIG. 7.

According to an embodiment, when a fourth application is installed in the electronic device 100 and is a shared application to be executed in the external device 300, installed in the external device 300 and is executable at the electronic device 100, the electronic device 100 may further include the first identifier 10 and the second identifier 20 in an icon 640 corresponding to the fourth application and display. The fourth application may be installed in both the electronic device 100 and the external device 300. The electronic device 100 may execute a fourth application installed in the external device 300, or the external device 300 may execute a fourth application installed in the electronic device 100.

Referring to FIG. 6, the first identifier 10, the second identifier 20, and a third identifier 30 are illustrated as a text, but the embodiment is not limited thereto. The first identifier 10, the second identifier 20, and the third identifier 30 may be implemented as various identifiers that may be distinguished from other application icons.

Figure 7:
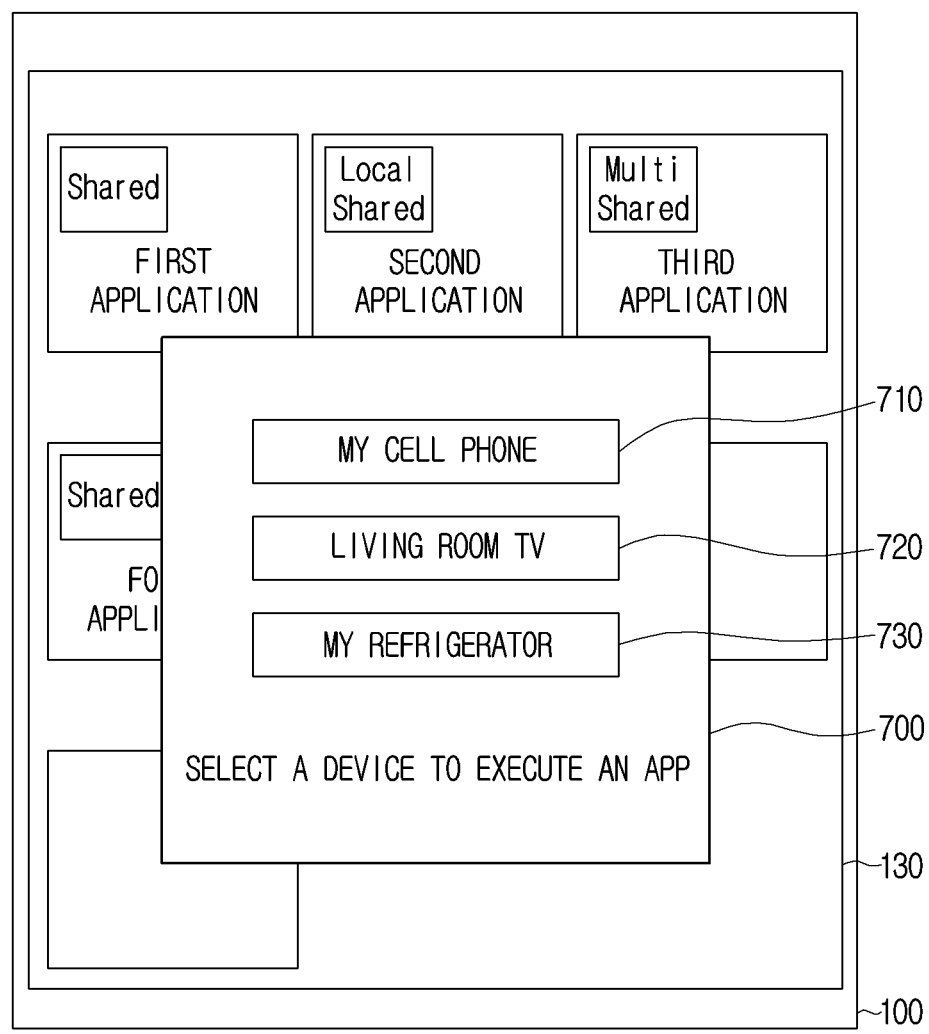
FIG. 7 is a diagram illustrating an example UI for selecting a device to execute a sharing application when there are a plurality of devices in which the sharing application is installed according to various embodiments.

FIG. 7 is a diagram illustrating an example UI for selecting a device to execute the sharing application, when there are a plurality of devices in which the sharing application is installed according to various embodiments.

According to an embodiment, when the icon 630 corresponding to a third application installed in a plurality of external devices is selected, the electronic device 100 may display a UI 700 for selecting an external device to execute a third application on the display 130.

According to an embodiment, if the third application is installed in "my cell phone," "living room TV," and "my refrigerator" connected to the electronic device 100, a UI 700 may include a first icon 710 corresponding to "my cell phone", a second icon 720 corresponding to a "living room TV", and a third icon 730 corresponding to "my refrigerator." If one of the icons is selected, the electronic device 100 may control the external device corresponding to the selected icon to execute the third application. For example, when a second icon 720 is selected from the icons displayed on the UI 700, the electronic device 100 may control the third application to be executed in an external device corresponding to the "living room TV".

Figure 8A:
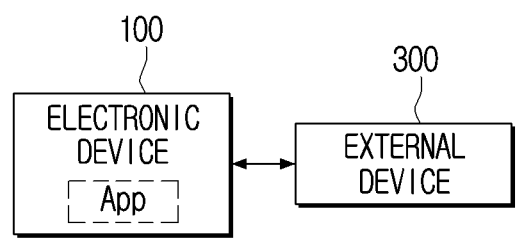
FIG. 8A is a block diagram illustrating a method for executing an application installed in an electronic device by an external device according to an embodiment.
Figure 8B:
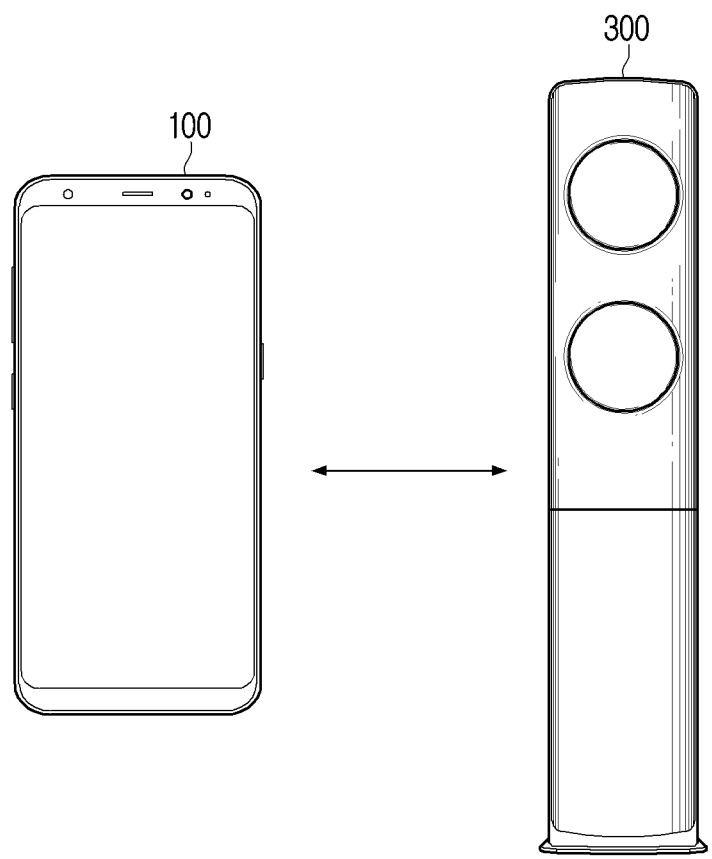
FIG. 8B is a diagram illustrating an example of executing an application installed in an electronic device by an external device according to various embodiments.

FIG. 8A is a block diagram illustrating an example method for executing an application installed in an electronic device by an external device according to various embodiments, and FIG. 8B is a diagram illustrating an example of executing an application installed in an electronic device by an external device according to various embodiments.

According to an embodiment, the electronic device 100 may control an application installed in the electronic device 100 to be executed in the external device 300. The electronic device 100 may search for the external device 300 connectable to the electronic device 100, and may perform connection with the searched external device 300. According to an embodiment, the UDP packet may be transmitted to a specific port for each external device IP in the network, and identify the external device 300 that receives the information responding to the UDP packet at the electronic device 100 as the external device 300 connectable to the electronic device 100.

The electronic device 100 may transmit information on an application installed in the electronic device 100 to the connected external device 300, and the external device 300 may identify at least one application executable at the external device 300 through information on an application installed in the electronic device 100. According to an embodiment, the information on the installed application may include information about a list for an application installed in the electronic device and the application manifest information. In the above description, at least one application executable at the external device 300 is identified in the external device 300, but the embodiment is not limited thereto, and the electronic device 100 may identify at least one application executable at the external device 300.

The electronic device 100 may display an icon corresponding to at least one identified application on a display of the electronic device 100. If one of the at least one icon is selected, the electronic device 100 may perform communication with the external device 300 to control the application corresponding to the selected icon to be executed in the external device 300.

FIG. 8B is a diagram illustrating that the electronic device 100 is implemented as a smart phone and the external device 300 is implemented as an air purification device. According to an embodiment, the electronic device 100 may control the air purification device control application installed in the electronic device 100 to be executed in the external device 300, which is an air purification device. The electronic device 100 may control the air purification device control application installed in the electronic device 100 to be executed by the external device 300 to control the external device 300. Since the air purification device control application is installed in the electronic device 100, the electronic device 100 may easily manage the indoor environment information in which the external device 300, which is an air purification device, is installed.

Through the above example, the electronic device 100 may control so that the external device 300 without sufficient storage space may execute the application installed in the electronic device 100.

Figure 9:
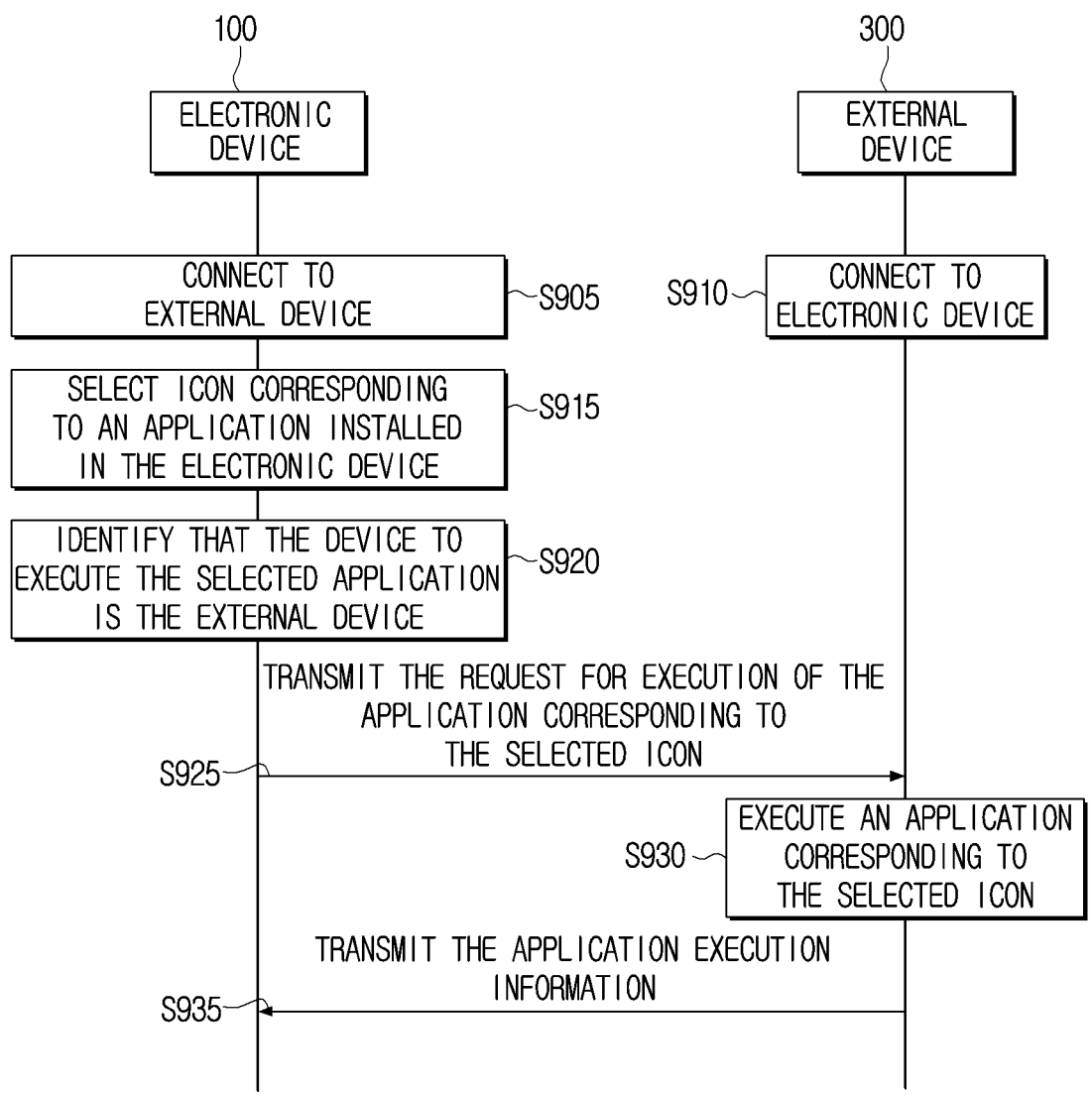
FIG. 9 is a signal flow diagram illustrating an example method for executing an application installed in an electronic device by an external device according to various embodiments.

FIG. 9 is a signal flow diagram illustrating an example method for executing an application installed in an electronic device by an external device according to various embodiments.

When the electronic device 100 is connected to the external device 300 in operation S905, and the external device 300 is connected to the electronic device 100 in operation S910, an icon corresponding to an application installed in the electronic device 100 may be selected by the user in the electronic device 100 in operation S915. At least one icon corresponding to at least one application executable at the external device 300, among applications installed in the electronic device 100, may be displayed in the electronic device 100, and one icon of at least one icon may be selected by the user.

If the icon is selected, the electronic device 100 may identify that the device to execute the application corresponding to the selected icon may be the external device 300 in operation S920. According to an embodiment, when an icon is selected, as shown in FIG. 7, the electronic device 100 may display a UI for selecting an external device to execute an application corresponding to the selected icon on the display 130, and may identify the device to execute the application corresponding to the selected icon as the external device 300 through the UI.

If the device to execute the application corresponding to the selected icon is identified as the external device 300, the electronic device 100 may transmit the request for execution of the application corresponding to the selected icon to the external device 300 in operation S925.

When the external device 300 receives the request for execution of the application, the external device 300 may execute an application corresponding to the selected icon in operation S930 and may transmit the application execution information to the electronic device 100 in operation S935. The electronic device 100 may control a corresponding application to be executed in the external device 300 through application execution information received from the external device 300.

Figure 10A:
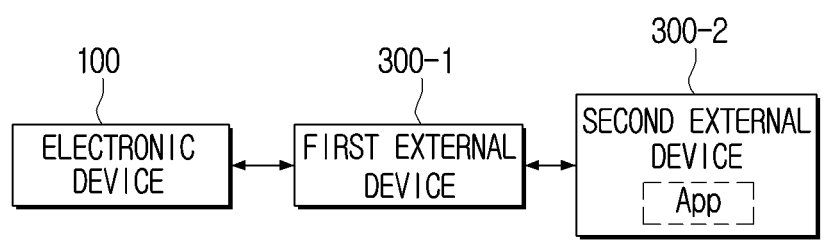
FIG. 10A is a block diagram illustrating an example method of executing an application installed in a second external device by a first external device through an electronic device according to various embodiments.

FIG. 10A is a block diagram illustrating an example method of executing an application installed in a second external device by a first external device through an electronic device according to various embodiments.

According to an embodiment, the electronic device 100 may control the first external device 300-1 and the second external device 300-2 so that the application installed in the second external device 300-2 may be executed by the first external device 300-1.

When the electronic device 100 is connected to the first external device 300-1 and the second external device 300-2, the electronic device 100 may identify at least one application executable at the first external device 300-1 among the applications installed in the second external device 300-2. For example, the electronic device 100 may acquire information on an application installed in the second external device 300-2 from the second external device 300-2, and obtain information on the first external device 300-1 from the first external device 300-1. In an embodiment, the information on the application installed in the second external device 300-2 may include application manifest information and information about a list of an application installed in the external device. The information on the first external device 300-1 may include information about an application executable at the first external device 300-1.

The electronic device 100 may identify at least one application executable at the first external device 300-1 of the application installed in the second external device 300-2, on the basis of the information on the application installed in the second external device 300-2 and the information on the first external device 300-1.

The first external device 300-1, without limitation, may identify at least one application executable at the first external device 300-1 of the application installed in the second external device 300-2. The electronic device 100 may search for the first external device 300-1 connectable to the electronic device, and may receive information about an application installed in the second external device 300-2 executable at the first external device 300-1 from the searched first external device 300-1.

The electronic device 100 may display an icon corresponding to each application installed in the second external device 300-2 executable at the first external device 300-1 on the display 130 based on the received information about the application.

If the icon corresponding to the application installed in the second external device 300-2 is selected, the electronic device 100 may transmit the application execution request to the first external device 300-1 so that the application corresponding to the selected icon is executed in the first external device 300-1. A method of executing an application installed in the second external device 300-2 in the first external device 300-1 will be described later with reference to FIG. 11.

Figure 10B:
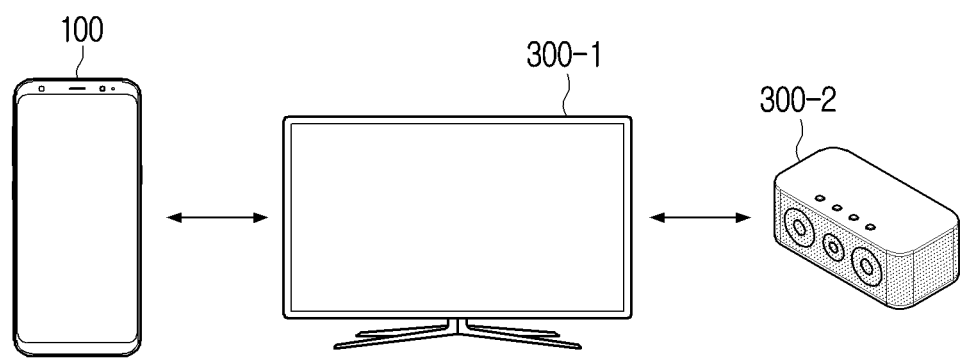
FIG. 10B is diagram illustrating an example of executing an application installed in a second external device by a first external device through an electronic device according to various embodiments.

FIG. 10B is a diagram illustrating an example of executing an application installed in a second external device by a first external device through an electronic device according to various embodiments.

Referring to FIG. 10B, the electronic device 100 may be implemented, for example, as a smartphone, and the second external device 300-2 may be implemented, for example as an artificial intelligence speaker. According to an embodiment, the electronic device 100 may control the first external device 300-1 to execute an artificial intelligence voice recognition application installed in the second external device 300-2 in the first external device 300-1. Even in the first external device 300-1, a voice recognition application installed in the second external device 300-2 may be executed in the first external device 300-1, without separate installation of a voice recognition application, so that a voice recognition service may be provided through the first external device 300-1.

According to an embodiment, management of the voice recognition application installed in the second external device 300-2 may be performed through the display of the first external device 300-1. The electronic device 100 may control the application installed in the second external device 300-2 to be executed in the first external device 300-1, and may change the setting of the voice recognition application installed in the second external device 300-2 in the first external device 300-1. Also, an update for a voice recognition application installed in the second external device 300-2 may be performed in the first external device 300-1.

According to an embodiment as described above, the electronic device 100 may control the application installed in the second external device 300-2 not including the display to be executed in the first external device 300-1 including the display, so that management of the application installed in the second external device 300-2 may be performed in the first external device 300-1.

Figure 11:
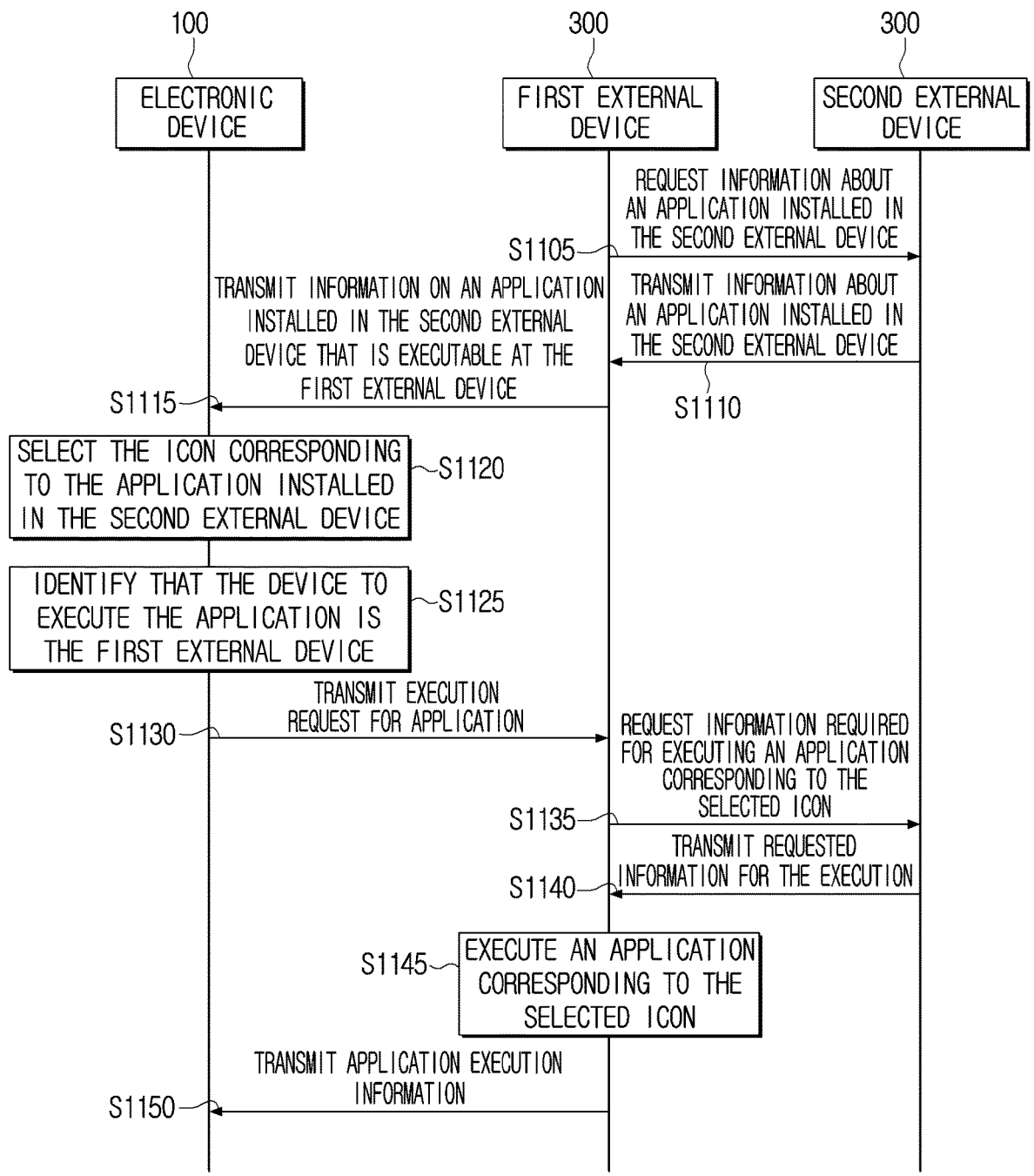
FIG. 11 is a signal flow diagram illustrating an example method for executing an application installed in a second external device by a first external device through an electronic device according to various embodiments.

FIG. 11 is a signal flow diagram illustrating an example method for executing an application installed in a second external device by a first external device through an electronic device according to various embodiments.

As illustrated in FIGS. 10A and 10B, the electronic device 100, the first external device 300-1, and the second external device 300-2 may be connected to each other. When a connection between the first external device 300-1 and the second external device 300-2 is performed, the first external device 300-1 may request information about an application installed in the second external device 300-2 to the second external device 300-2 in operation S1105. The second external device 300-2 may transmit information about an application installed in the second external device 300-2 to the first external device 300-1 in operation S1110. The first external device 300-1 may transmit information on an application installed in the second external device 300-2 that is executable at the first external device 300-1 to the electronic device 100 in operation S1115.

The electronic device 100 may display icons corresponding to each of the at least one icon installed in the second external device 300-2 executable at the first external device 300-1 based on the display of the electronic device 100 based on the received information about the application.

If the icon corresponding to the application installed in the second external device 300-2 is selected by the user in the electronic device 100 in operation S1120, the electronic device 100 may identify that the device to execute the application corresponding to the selected icon is the first external device 300-1 in operation S1125. According to an embodiment, when an icon corresponding to an application installed in the second external device 300-2 is selected, the electronic device 100 may display a UI for selecting an external device to execute an application corresponding to the selected icon on the display 130. The electronic device 100 may identify that the external device to execute the application is the first external device 300-1 through the UI.

If the device to execute the application corresponding to the selected icon is identified to be the first external device 300-1, the electronic device 100 may transmit an execution request for the corresponding application to the first external device 300-1 in operation S1130. The first external device 300-1 may request information required for executing an application corresponding to the selected icon to the second external device 300-2 in operation S 1135. The second external device 300-2 may transmit requested information for the execution to the first external device 300-1 in operation S1140, and the first external device 300-1 may execute an application installed in the second external device 300-2 through the received information in operation S1145.

The first external device 300-1 may transmit application execution information corresponding to the application executed in operation S1145 to the electronic device 100 in operation S1150. When an application corresponding to the selected icon is executed in the first external device 300-1, the first external device 300-1 may transmit application execution information corresponding to the executed application to the electronic device 100. That is, the electronic device 100 may control the application installed in the second external device 300-2 to be executed in the first external device 300-1 through the application execution information received from the first external device 300-1.

FIG. 12 is a flowchart illustrating an example method for controlling an electronic device according to various embodiments.

The electronic device 100 may search for the external device 300 connectable to the electronic device 100 in operation S1210. An external device may be a device for executing an application by installing an application. The electronic device 100 may search for an external device within a network environment which is the same as the electronic device 100. According to an embodiment, the external device within the same network environment may be an external device present in a network connection environment (LAN, WAN, BT, etc.), same as electronic device 100. In an embodiment, the external device within the same network environment may be an external device within a Wi-Fi environment same as the electronic device 100.

The electronic device 100 may request information about an application installed in the external device 300 from the searched external device 300 in operation S1220. The electronic device 100 may receive information about an application installed from the external device 300 in operation S1230. In an embodiment, information on an application installed in an external device may include an application manifest information and an application list installed in an external device. The application manifest information may be information necessary for execution of the application. In an embodiment, the application manifest information may include execution code and data necessary for execution of the application. In an embodiment, the application manifest information may include at least one of information about a version of an application, information about an authority required for executing an application, information on an application package ID, information on the platform API version, information on an application execution file, information on an icon file, or developer information. However, the application manifest information may further include other information necessary for executing the application.

When the electronic device 100 receives, from the external device 300, information about an application installed in the external device 300, the electronic device 100 may identify at least one application executable at the electronic device 100 among a plurality of applications included in the information about the application installed in the external device 300 in operation S1240. According to an embodiment, the electronic device 100 may identify at least one application executable at the electronic device 100 among the applications included in the application list installed in the external device using information on a platform minimum version in which each of a plurality of applications included in the application manifest information are executable, information about ISA (ARM, x86, etc.), or VM version and type, information on the type and model of the external device 300, information on the type and model of the external device, information on supportable country for each of the plurality of applications installed in the external device.

The electronic device 100 may display at least one icon corresponding to at least one identified application on a display based on the information about the installed application in operation S1250. According to an embodiment, the electronic device 100 may display an icon corresponding to an executable application in the electronic device 100, among the applications installed in the external device 300, on a home screen, an APPs list, a widget list on a display, or the like.

When one of the at least one icon displayed on the display is selected in operation S1260, the electronic device 100 may request information (execution code and data, etc.) required for execution of the application corresponding to the selected icon by communicating with the external device 300 in operation S1270.

The electronic device 100 may obtain, from the external device 300, information (execution code and data, etc.) necessary for execution and execute the application installed in the external device 300 in operation S1280.

Embodiments of the disclosure have been described with reference to the accompanying drawings. However, this disclosure is not intended to limit the embodiments described herein but includes various modifications, equivalents, and/or alternatives. In the context of the description of the drawings, like reference numerals may be used for similar components.

In this document, the expressions "have," "may have," "including," or "may include" may be used to denote the presence of a feature (e.g., a component, such as a numerical value, a function, an operation, a part, or the like), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, may be used in order to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

The term such as "module," "unit," "part," and so on is used to refer to an element that performs at least one function or operation, and such element may be implemented as hardware or software, or a combination of hardware and software. Further, except for when each of a plurality of "modules," "units," "parts," and the like need to be implemented in an individual hardware, the components may be integrated in at least one module or chip and implemented in at least one processor.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

The electronic device according to various embodiments may, for example, and without limitation, include at least one of, for example, smartphones, tablet personal computer (PC)s, mobile phones, video telephones, artificial intelligence (AI) speaker, electronic book readers, desktop PCs, laptop PCs, netbook computers, workstations, servers, a personal digital assistant (PDA), a portable multimedia player (PMP), a moving picture experts group phase 1 or phase 2 (MPEG-1 or MPEG-2) audio layer 3 (MP3) player, a mobile medical device, a camera, a wearable device, or the like.

In an embodiment, the electronic device may include, for example, and without limitation, at least one of a furniture, a portion of a building/structure, an electronic board, an electronic signature receiving device, a projector, various metrology instruments (e.g., water, electricity, gas, or radio wave measuring equipment, or the like), or the like. The electronic device according to various embodiments may include, for example, one or a combination of the aforementioned various devices. The electronic device according to an embodiment may be a flexible electronic device. The electronic device according to an embodiment may include an electronic device that is connected to the external Internet through connection with a network equipment, such as an access point, a gateway, a router, a switch, or the like, and may include a new electronic device in accordance with the technology development.

The electronic device 100 may include a device capable of performing registration, control, management, and the like, for another electronic device. In some cases, the electronic device 100 may be referred to, for example, as a control device, and the other electronic device may be referred to as a controlled device.

The various example embodiments described above may be implemented in software, hardware, or the combination of software and hardware. By hardware implementation, the example embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. Various embodiments described herein may be implemented by the processor 140 of the electronic device 100. According to a software implementation, example embodiments of the disclosure, such as the procedures and functions described herein may be implemented with separate software modules. Each of the above-described software modules may perform one or more of the functions and operations described herein.

The various example embodiments as described above may be implemented with software including instructions stored in the machine-readable storage media readable by a machine (e.g., a computer). A machine may refer, for example, to a device which may call instructions from the storage medium and operate according to the called instructions, and may include the electronic device 100 of the embodiments.

When the instructions are executed by a processor, the processor may perform a function corresponding to the instructions directly or using other components under the control of the processor. The instructions may include a code generated by a compiler or a code executable by an interpreter. For example, a method for controlling an electronic device may be performed by an instruction stored in a storage medium is executed by a processor. For example, by executing the instruction by a processor of a device (or an electronic device), searching an external device connectable to an electronic device; request information about an application installed in the external device to the searched external device, through the communication interface; receive, from the external device, information about the installed application, through the communication interface; identify at least one application, among a plurality of applications included in the information about the installed application, which is executable at the electronic device; display, on the display, at least one icon corresponding to the at least one identified application based on the information about the installed application, and based on one of the at least one icon being selected, requesting information required for execution of an application corresponding to the selected icon by communicating with the external device and executing the application installed in the external device may be performed.

A machine-readable storage medium may be provided in the form of a non-transitory storage medium. Herein, the term "non-transitory" simply denotes that a storage medium does not include a signal but is tangible, and does not distinguish the case in which a data is semi-permanently stored in a storage medium from the case in which a data is temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly. In the case of on-line distribution, at least a portion of the computer program product may be stored temporarily or at least temporarily in a storage medium such as a manufacturer's server, a server of an application store, or a memory of a relay server.

Wired communication may include, for example, and without limitation, a universal serial bus (USB), a high definition multimedia interface (HDMI), a recommended standard 232 (RS-232), a power line communication, or a plain old telephone service (POTS). The network over which the wireless or wired communication is performed may include any one or any combination of a telecommunications network, for example, a computer network (for example, local area network (LAN) or wide area network (WAN)), the Internet, or a telephone network.

While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure including, for example, the appended claims and their equivalents.

What is claimed is:

1. A method for controlling an electronic device, the method comprising:
    searching for one or more external electronic devices connectable to the electronic device;
    requesting, from each respective external electronic device of one or more external electronic devices identified by the searching, information corresponding to an application installed in the respective external electronic device;
    receiving, from each respective external electronic device, application information corresponding to the application installed therein;

identifying at least one application, among a plurality of applications included in the application information received from the identified external electronic devices, which is executable by the electronic device;

displaying, on a display, at least one icon corresponding to the at least one identified application, based on the application information;

receiving an input for selecting one of the at least one icon;

based on an input for selecting one of the at least one icon, displaying, on the display, a list of the identified external electronic devices on which an application corresponding to the selected icon is installed; and based on an input for selecting one of the identified external electronic devices from the list, requesting information required for execution of the application corresponding to the selected icon by communicating with the selected external electronic device in which the application is installed, receiving the execution information, and executing the application installed in the selected external electronic device.

2. The method of claim 1, wherein the searching comprises:

transmitting a user datagram protocol (UDP) to a specific port for each external electronic device Internet protocols (IPs) in a network; and identifying, as the one or more external electronic devices to which the electronic device is connectable, external electronic devices from which information responding to the UDP packet is received.

3. The method of claim 1, wherein the application information corresponding to the installed application comprises information including application manifest information and information corresponding to a list of one or more applications installed in the respective external electronic device.

4. The method of claim 1, wherein at least one icon corresponding to the at least one identified application further comprises an identifier distinguishing the at least one icon from an icon corresponding to an application installed in the electronic device.

5. The method of claim 1, further comprising:
displaying a list for the at least one identified application, wherein the at least one icon corresponds to an application selected from the list.

6. The method of claim 1, further comprising:
receiving an execution file corresponding to the selected icon and storing the execution file; and
searching a location where a file for the application is stored in the selected external electronic device using package identification (ID) information included in manifest information for the application corresponding to the selected icon and package manager information.

7. The method of claim 6, further comprising:
based on the location where the file for the application is stored in the electronic device being different from a location where the file for the application is stored in the selected external electronic device, generating folder mapping information to identify a location of storage of the file for the application.

8. The method of claim 1, further comprising:
identifying whether a file required for the application corresponding to the selected icon to be executed at the electronic device is stored in the electronic device;
based on the file not being stored in the electronic device, generating file mapping information for the file stored in the selected external electronic device; and requesting a write function and a read function for the file to the selected external electronic device through the file mapping information.

9. The method of claim 1, further comprising reconfiguring information corresponding to installation of the application corresponding to the selected icon to correspond to a format of a package manager of the electronic device.

10. An electronic device comprising:
a display;
a communication interface comprising communication circuitry;
a memory including at least one instruction; and
a processor, connected to the display, the communication interface, and the memory, configured to control the electronic device,
wherein the processor, by executing the at least one instruction, is configured to control the electronic device to:
search for one or more external electronic devices connectable to the electronic device,
request, from each respective external electronic device of one or more external electronic devices identified by the search, through the communication interface, information corresponding to an application installed in the respective external electronic device,
receive, from each respective external electronic device, application information corresponding to the application installed therein, through the communication interface,
identify at least one application, among a plurality of applications included in the application information received from the identified external electronic devices, which is executable at the electronic device,
display, on the display, at least one icon corresponding to the at least one identified application, based on the application information,
receive an input for selecting one of the at least one icon;
based on an input for selecting one of the at least one icon, display, on the display, a list of the identified external electronic devices on which an application corresponding to the selected icon is installed; and
based on an input for selecting one of the identified external electronic devices from the list, request information required for execution of the application corresponding to the selected icon by communicating with the selected external electronic device in which the application is installed, receive the execution information, and execute the application installed in the selected external electronic device.

11. The electronic device of claim 10, wherein the processor is further configured to control the electronic device to:
transmit a user datagram protocol (UDP) to a specific port for each external electronic device Internet protocols (IPs) in a network, and
identify, as the one or more external electronic devices to which the electronic device is connectable, external electronic devices from which information responding to the UDP packet is received.

12. The electronic device of claim 10, wherein the application information corresponding to the installed application comprises information including application manifest information and information corresponding to a list of one or more applications installed in the respective external electronic device.

13. The electronic device of claim 10, wherein at least one icon corresponding to the at least one identified application further comprises an identifier distinguishing the at least one icon from an icon corresponding to an application installed in the electronic device.

14. The electronic device of claim 10, wherein the processor is further configured to control the electronic device to:
 display a list for the at least one identified application, wherein the at least one icon corresponds to an application selected from the list.

15. The electronic device of claim 10, wherein the processor is further configured to control the electronic device to:
 receive an execution file corresponding to the selected icon and store the execution file in a memory, and
 search a location where a file for the application is stored in the selected external electronic device using package identification (ID) information included in manifest information for the application corresponding to the selected icon and package manager information.

16. The electronic device of claim 15, wherein the processor is further configured to control the electronic device to:
 based on the location where the file for the application is stored in the electronic device being different from a location where the file for the application is stored in the external electronic device, generate folder mapping information to identify a location of storage of the file for the application.

17. The electronic device of claim 10, wherein the processor is further configured to control the electronic device to:
 identify whether a file required for the application corresponding to the selected icon to be executed in the electronic device is stored in the electronic device,
 based on the file not being stored in the electronic device, generate file mapping information for the file stored in the selected external electronic device, and
 request a write function and a read function for the file to the selected external electronic device through file mapping information.

18. The electronic device of claim 10, wherein the processor is further configured to control the electronic device to reconfigure information corresponding to installation of the application corresponding to the selected icon to correspond to a format of a package manager of the electronic device.

* * * * *